No. 854,566. PATENTED MAY 21, 1907.
H. T. CAMERON.
STEERING GEAR SOCKET FOR AUTOMOBILES.
APPLICATION FILED AUG. 15, 1906.

Witnesses
Edward Rowland
M. F. Keating

Inventor
Henry T. Cameron
By his Attorney
Charles J. Kintner

UNITED STATES PATENT OFFICE.

HENRY T. CAMERON, OF NEW YORK, N. Y.

STEERING-GEAR SOCKET FOR AUTOMOBILES.

No. 854,566.　　　　　Specification of Letters Patent.　　　　　Patented May 21, 1907.

Application filed August 15, 1906. Serial No. 330,688.

*To all whom it may concern:*

Be it known that I, HENRY T. CAMERON, a citizen of the United States, residing at New York, borough of Manhattan, county and State of New York, have made a new and useful Invention in Steering-Gear Sockets for Automobiles, of which the following is a specification.

My invention is directed particularly to improvements in universal joints of the ball and socket type for use in connection with the steering gear of automobiles and it has for its objects, first, to materially strengthen such sockets and their interconnected parts; second, to provide means whereby such sockets may be readily adjusted in the event of their becoming loose or worn; third, to provide means whereby all dirt, dust, or grit shall be absolutely and positively excluded from admission to the socket proper.

Prior to my invention sockets of the type referred to for connecting the steering gear to the axles of such vehicles had been devised in which the ball part of the socket was admitted through an opening in that part which is attached directly to the axle of the vehicle and a sleeve was forced over the end of such part so that the inward end of the sleeve would have a bearing against the ball part of the socket. A socket had also been devised which was composed of a hollow slitted sleeve internally screw-threaded at both ends and provided on one side with an opening of sufficient size to admit of the insertion of the ball or male part of a ball and socket joint, the female parts thereof being inclosed within the sleeve and held adjustably therein by a screw-thread upon one of said parts, a bolt extending through lugs or ears on the slitted side of the sleeve. Sockets of this nature, however, quickly become worn out, owing to the inaccurate fit or lack of self-adjustment of the parts, and also to the fact that by reason of the opening through which the shank of the ball part extends, dirt, dust or grit had free access to all of the frictional parts, and it was with a view of overcoming these very objectionable features and of therefore rendering such sockets safer and more certain of operation that the present invention was devised.

Figure 1:
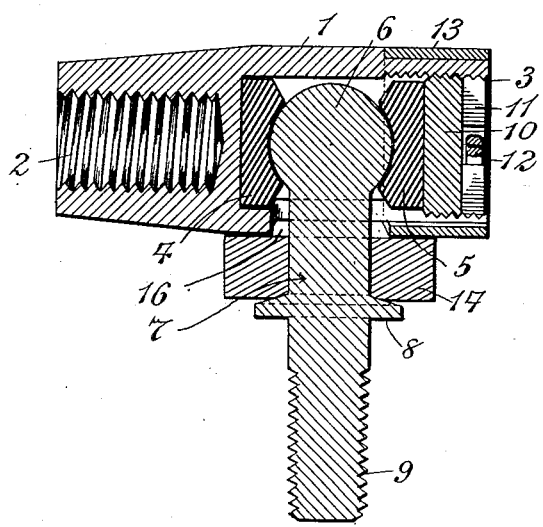
Figure 2:
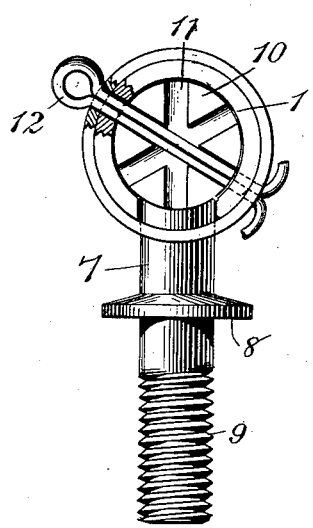

My invention will be fully understood by referring to the accompanying drawings, in which, Figure 1 is a sectional view taken through the entire attachment; and Fig. 2 is an end elevational view as seen looking at Fig. 1 from right to left, a portion of said figure being broken away to show the connecting relations between the locking cotter-pin and the adjustable parts of the socket.

Referring now to the drawings in detail, 1 represents a metallic sleeve bored out at one end for receiving the ball and socket parts and provided at the other end with a screw-thread 2 for securing the part to the axle of a vehicle.

3 is a screw-thread at the open end of the sleeve 1 for receiving a set-nut 10, and 4 and 5 are the female parts and 6 the male part of the ball and socket joint, said female parts fitting accurately within the opening in the sleeve 1. The ball or male part 6 of the ball and socket joint is provided with a shank 7 and an enlargement or shoulder 8 at its outer end; 9 being a screw-thread for connecting it to the interconnecting rods running to the steering gear.

16 is a longitudinal slot in one side of the sleeve 1 having a width slightly greater than that of the shank 7 and less than the diameter of the ball 6, the arrangement being such that the ball part of the joint is inserted in the end of the sleeve, while the shank 7 thereof enters the slot.

11, 11 are radially disposed slots in the set-nut 10 and 12 is a cotter-pin; 13 being a metallic band surrounding the outer end of the sleeve 1 and provided on opposite sides with holes or openings adapted to calender with the slots 11, 11 of the set-nut 10, the function of said band being to secure all of the parts together.

14 is a washer, preferably of rubber, having an opening adapted to surround the shank 7 of the male part 6 below the shoulder 8 and to close when the parts are put together that part of the slot or opening 16 in the sleeve 1 after the metallic band 13 has been slipped into position about the end thereof said washer constituting in effect yielding means for preventing the ingress of dirt, dust or grit.

It will be apparent on examination of the drawing that when the parts are assembled in the manner shown the male and female parts of the ball and socket joint are brought to bear upon each other within the opening in the sleeve 1 with the desired firmness through the agency of the set-nut 10, after which the band 13 is slipped over the end of the sleeve and the cotter-pin 12 forced through the openings therein and the corresponding slot 11 of the nut, so that when the washer 14 is in place the entire socket is securely sealed against the admission of dirt, dust, or grit and there is sufficient movement in the direction the length of the slot 16 to permit of the desired movement with relation to all of the movable parts of the steering apparatus.

I desire it understood that such a socket is not only used in connection with the axles of a vehicle, but may be used at various points of the machine where it is required to utilize a universal joint movement.

I do not limit my invention to the details of construction shown, as I believe it is broadly new with me to provide a universal socket joint for the steering gear of automobiles in which the joint is made adjustable and self-sealed when closed, and to retain all of the parts together through the agency of a surrounding band which greatly strengthens the entire structure.

Having thus described my invention what I claim and desire to secure by Letters Patent of the United States is—

1. A steering gear socket embracing a metallic sleeve slotted at one side; a ball and socket joint embracing male and female parts; a detachable metallic band which surrounds the outer end of the sleeve; in combination with interlocking means for locking the band and the parts of the joint securely in position when once adjusted, substantially as described.

2. A steering gear socket embracing a hollow sleeve provided with a slot at one side; a ball and socket joint secured in said sleeve and means for securing said parts adjustably together; in combination with additional means for preventing the admission or ingress of dirt, dust or grit, the aforesaid slot having a width less than the diameter of the bowl part of the joint, substantially as described.

3. A steering gear socket embracing a hollow sleeve screw-threaded internally at both ends and slotted at one side; a ball and socket joint, the ball part being connected by a shank having a diameter substantially the same as the width of the slot, and female parts fitted within one end and surrounding the ball; together with an adjustable screw-threaded nut for securing said parts together, the arrangement being such that the ball may be inserted into the sleeve from one end thereof, substantially as described.

4. A steering gear socket embracing a hollow sleeve having a ball and socket joint located therein, said sleeve being slotted at one side to receive the shank of the male part of the joint; in combination with a detachable band which surrounds the outer end of the sleeve, and means for locking all of said parts together, substantially as described.

5. A steering gear socket embracing a ball and socket joint secured in a hollow sleeve and provided with means for adjusting the parts of the socket with relation to each other, and yielding means for preventing the admission or ingress of dirt, dust, or grit, substantially as described.

6. A steering gear socket embracing a hollow sleeve screw-threaded at one end for attaching it to the axle of a vehicle and provided with a ball and socket joint located in the other end and an adjustable nut provided with means for varying the relations of the parts of the joint; additional means surrounding the end of the sleeve; together with a locking pin adapted to lock all of the parts together when in position, substantially as described.

In testimony whereof I have signed my name to this specification in the presence of two subscribing witnesses.

HENRY T. CAMERON.

Witnesses:
C. J. KINTNER,
W. L. BENNETT.